(12) United States Patent
Weber (10) Patent No.: US 11,299,212 B2
(45) Date of Patent: Apr. 12, 2022

(54) CONNECTION OF ELEMENTS IN MOTOR VEHICLES

(71) Applicant: SIKA TECHNOLOGY AG, Baar (CH)

(72) Inventor: Philip E. Weber, Novi, MI (US)

(73) Assignee: SIKA TECHNOLOGY AG, Baar (CH)

( * ) Notice: Subject to any disclaimer, the term of this patent is extended or adjusted under 35 U.S.C. 154(b) by 19 days.

(21) Appl. No.: 16/615,440

(22) PCT Filed: Jun. 11, 2018

(86) PCT No.: PCT/EP2018/065393
§ 371 (c)(1),
(2) Date: Nov. 21, 2019

(87) PCT Pub. No.: WO2018/234082
PCT Pub. Date: Dec. 27, 2018

(65) Prior Publication Data
US 2020/0172173 A1 Jun. 4, 2020

(30) Foreign Application Priority Data
Jun. 22, 2017 (EP) .................................. 17177312

(51) Int. Cl.
*B62D 27/02* (2006.01)
*B29C 65/54* (2006.01)
(Continued)

(52) U.S. Cl.
CPC .......... *B62D 27/026* (2013.01); *B29C 65/542* (2013.01); *B29C 66/022* (2013.01);
(Continued)

(58) Field of Classification Search
CPC .... B62D 27/026; B62D 27/06; B62D 29/001; B62D 29/04; B62D 65/02; B29C 65/542;
(Continued)

(56) References Cited

U.S. PATENT DOCUMENTS 3,847,694 A * 11/1974 Stewing ............. B29K 2027/06
156/86
3,902,949 A * 9/1975 Norman ................. F16B 11/006
156/252

(Continued)

FOREIGN PATENT DOCUMENTS

CN 1596161 A 3/2005
DE 19929057 A1 12/2000
(Continued)

OTHER PUBLICATIONS

Machine Translation of DE-10260430-A1, Jul. 2004 (Year: 2004).*
(Continued)

*Primary Examiner* — Philip C Tucker
*Assistant Examiner* — Brian R Slawski
(74) *Attorney, Agent, or Firm* — Oliff PLC (57) ABSTRACT

A system of connected elements for a motor vehicle includes: a first element which has at least one depression on a surface; a second element which is arranged on the first element in such a manner that a surface of the second element and the depression of the first element form a cavity; a filling opening which forms an access to the cavity; and an adhesive which at least partially fills the cavity and thereby adhesively bonds the first element to the second element.

6 Claims, 6 Drawing Sheets

(51) Int. Cl.
  *B62D 29/00* (2006.01)
  *B62D 29/04* (2006.01)
  *B62D 65/02* (2006.01)
  *B29C 65/00* (2006.01)
  *B29C 65/48* (2006.01)

(52) U.S. Cl.
  CPC .......... *B62D 29/001* (2013.01); *B62D 29/04* (2013.01); *B62D 65/02* (2013.01); *B29C 65/485* (2013.01); *B29C 65/4835* (2013.01); *B29C 66/21* (2013.01); *B29C 66/301* (2013.01); *B29C 66/30325* (2013.01); *B29C 66/43* (2013.01); *B29C 66/919* (2013.01)

(58) Field of Classification Search
  CPC ......... B29C 65/00; B29C 65/02; B29C 65/48; B29C 65/4835; B29C 65/485; B29C 65/72; B29C 66/022; B29C 66/0222; B29C 66/0224; B29C 66/301; B29C 66/21; B29C 66/30325; B29C 66/43; B29C 66/919
  USPC ..... 156/60, 91, 92, 196, 209, 210, 212, 214, 156/219, 290, 291, 305, 307.1; 29/525.11, 432, 432.1, 432.2, 469.5, 505; 403/266, 268; 428/174, 178, 195.1, 198
  See application file for complete search history.

(56) References Cited

U.S. PATENT DOCUMENTS

| | | | | |
|---|---|---|---|---|
| 3,920,268 | A | * | 11/1975 | Stewing ............ B29C 66/73715 285/21.1 |
| 2003/0102668 | A1 | * | 6/2003 | Tarbutton ............. B62D 23/005 285/328 |
| 2008/0102249 | A1 | * | 5/2008 | Ristoski ................ C09J 133/04 428/138 |
| 2010/0092733 | A1 | | 4/2010 | Blank et al. |
| 2016/0193988 | A1 | | 7/2016 | Plotzitzka et al. |

FOREIGN PATENT DOCUMENTS

| | | | | |
|---|---|---|---|---|
| DE | 10260430 | A1 | * 7/2004 | ....... B29C 66/43421 |
| WO | 2011/131334 | A1 | 10/2011 | |
| WO | 2015/036251 | A1 | 3/2015 | |

OTHER PUBLICATIONS

Sep. 18, 2018 International Search Report issued in International Patent Application No. PCT/EP2018/065393.

Dec. 24, 2019 International Preliminary Report on Patentability issued in International Patent Application No. PCT/EP2018/065393.

\* cited by examiner

CONNECTION OF ELEMENTS IN MOTOR VEHICLES

The invention relates to a system of connected elements for motor vehicles, and also to a method for connecting elements in motor vehicles.

For connection, elements, such as extrusion profiles, castings or panels, for example, are frequently bonded adhesively to one another. This is done using adhesives which are applied in the form of slugs of adhesive to a first element, with a second element for bonding being applied thereafter to this slug of adhesive in order to bond the two elements. A disadvantage of known methods of this kind, however, is that the management of the elements to be bonded and also the application of the adhesive on the one hand are costly and inconvenient and on the other hand exhibit certain restrictions. For example, it is difficult, using this technique, to bond elements nested within one another to one another. The reason for this is that on attachment of the second element, the slug of adhesive applied to the first element may be stripped off, and is therefore no longer present at a desired position in order to bond the elements to one another.

The object on which the invention is based, therefore, is that of providing an improved system of connected elements for motor vehicles, and an improved method for connecting elements in motor vehicles, to allow elements in motor vehicles to be connected to one another in a way which is more cost-effective and easier to manage.

This object is first achieved by a system of connected elements for a motor vehicle, the system comprising: a first element which has at least one depression on one surface; a second element, which is arranged on the first element in such a way that a surface of the second element and the depression of the first element form a cavity; a filling aperture which forms an access to the cavity; and an adhesive which at least partially fills the cavity and thereby bonds the first element to the second element.

An advantage of the system proposed here is that it can also be used to connect elements to one another that are telescoped and so cannot be connected to one another conventionally using slugs of adhesive. The system proposed here can therefore be used very widely to connect elements irrespective of their geometry.

A core concept of the present invention is that the adhesive is not applied until the elements are arranged in their intended position relative to one another. This has the advantage that there is no need, when arranging the elements relative to one another, to consider slugs of adhesive that have already been applied, with the consequence that the elements can be arranged more efficiently and more cost-effectively.

In the case where numerous elements are being connected, moreover, it is an advantage if first all of the elements can be brought into their intended position, and that adhesive can then be introduced into all the cavities in one operation. Consequently there is no need for every element to be connected to be furnished individually with adhesive before it is arranged.

In one exemplary embodiment, the first element is a profile, a casting or a panellike element, and the second element is a profile, a casting or a panellike element.

Bodies of motor vehicles are typically constructed from such elements. In that case there may be different combinations of such elements that are to be connected to one another. A principal advantage of the present invention, then, is that the system proposed here for connecting elements can be applied universally for a wide variety of elements, irrespective of their shaping, material or mode of production. Accordingly, this system can be employed diversely in the construction of motor vehicles.

The designation "panellike element" in the context of this invention expressly embraces not only elements made of metal but also elements made of plastic or fiber-reinforced plastic. This designation therefore pertains merely to the form and not to the material of the element.

In the context of this invention, the designation "profile" expressly embraces elements produced in different ways. It embraces, for example, extrusion profiles, internal high-pressure forming profiles, or rolled panellike elements.

The designation "casting" in the context of this invention expressly embraces elements which are produced in different ways. For example, it embraces elements produced by dead-mold casting, ingot casting or continuous strand casting.

In one exemplary embodiment, the first element and/or the second element consist/consists at least partially of metal, plastic or fiber-reinforced plastic.

In a preferred refinement, the first and/or the second element consist/consists at least partially of polyamide, in particular of PA 6.6 (nylon).

In an alternative preferred refinement, the first and/or the second element consist/consists at least partially of steel, aluminum or magnesium or of combinations of these metals.

In an alternative preferred refinement, the first element and/or the second element consist/consists at least partially of fiber-reinforced plastics from the group of CFRP, GFRP or SMC.

An advantage of the system proposed here in particular is that different materials and combinations of materials can be connected to one another.

In one exemplary embodiment, a distance between shoulder and second element is at most 1 mm, preferably at most 0.8 mm, more preferably at most 0.5 mm, more preferably at most 0.3 mm.

Such a distance between shoulder and second element ensures that the adhesive remains substantially in the region of the open cavity between first element and second element, and so is effective at its intended position. The distance chosen may be larger or smaller depending on the adhesive used, more particularly on its viscosity. In principle, the shoulder and the second element may bear directly against one another, making the distance 0 mm.

In one exemplary embodiment, a depression width is between 3 and 50 mm, preferably between 5 and 40 mm, more preferably between 10 and 30 mm.

In one exemplary embodiment, a depression depth is between 0.5 and 5 mm, preferably between 0.8 and 4 mm, more preferably between 1 and 3 mm.

In one exemplary embodiment, a depression length is between 15 and 500 mm, preferably between 30 and 400 mm, more preferably between 40 and 150 mm.

An advantage of a depression of such sizing is that it can be used to cover applications of the system differently for the connecting of elements.

The depression may have a constant cross section, though in an alternative exemplary embodiment the depression may also have a nonconstant cross section. In that case the length, width and the depth of the depression may be nonconstant in form. Accordingly, for example, it is also possible to realize depressions which are less deep at ends than in a middle of the depression (below a filling aperture, for example), or depressions which in plan view have an oval shaping.

Of course, the depression need not extend linearly over its entire length, but instead may also be curved or made with diverse changes in direction.

In one exemplary embodiment, the depression has a V-shaped or U-shaped or an angular or a semicircular or an irregularly shaped cross section.

In a further exemplary embodiment, the depression has an irregularly shaped cross section. In that case, for example, a depression base may be of slanted design, so that the adhesive solidified therein has a wedge-shaped cross section. A wedge-shaped cross section of the adhesive of this kind, and a wedge-shaped cross section of the depression base, formed with corresponding complementarity, may have the effect of improving the tensile loading of the bonded elements, since a wedge effect can be achieved by means of this geometry. Accordingly, for example, the first element can be bonded more effectively, in terms of tensile loading, in the second element.

In a similar way, the cross section of the depression may also be formed with an undercut or with other forms of interengagement, so as to achieve even better connection between the elements.

In a further exemplary embodiment, the depression has branches.

In a further exemplary embodiment, the depression has a principal depression and lateral depressions connected thereto. The arrangement and configuration of the depression or depressions on the surface of the first element is dependent on the locations at which the first element is to be bonded to the second element. For this purpose, depressions which have a plurality of depressions configured separately from one another may be provided, or else depressions having branches and/or lateral depressions may be provided. In particular, lateral depressions may be used to enlarge the bond area between first element and second element.

In one preferred embodiment, the first or the second element has a filling aperture for introduction of the adhesive into the cavity.

The advantage of a filling aperture of this kind is that the adhesive can be introduced directly to the cavity.

In one preferred refinement, the filling aperture opens directly into the depression. In that case the filling aperture may be arranged centrally in relation to a length and/or width of the depression.

Furthermore, the filling aperture may be arranged in the first element, which also has the depression, or else the filling aperture may be arranged in the second element. In principle, the arrangement of the filling aperture is dependent on how the elements are accessible (in a situation in which the adhesive is to be introduced).

In one exemplary embodiment, the filling aperture has a diameter of 0.5 to 10 mm, preferably of 0.8 to 8 mm, more preferably of 1 to 5 mm.

In one exemplary embodiment, the first element and the second element, for the preliminary fixing of the first and second elements, are connected to one another at least partially before the adhesive is introduced. In one preferred embodiment, the elements are fixed preliminarily by a one-sided or two-sided mechanical joining technique, more particularly by riveting, welding, screwing or bolting.

Elements of this kind for fixing the first element with respect to the second element have the advantage that the elements remain in an intended position before the adhesive is solidified and/or fully cured.

In one exemplary embodiment, the first element and the second element is a profile. By way of example, these profiles have different-sized cross sections, allowing the smaller profile to be inserted into the larger profile. In that case the depression may be provided by choice in the smaller or in the larger profile, meaning that by choice the larger profile may be the first element or the second element in the sense of this invention.

In a further exemplary embodiment, the first and second elements are formed of in each case one profile and one panellike element. In that case, again, the depression may be provided by choice in the panellike element or else in the profile. Depending on that, accordingly, the profile is the first or the second element.

In a further exemplary embodiment, the first and the second elements are each a casting and profile. In that case, for example, the casting may have an aperture into which the profile can be inserted. Again, the depression may be provided either in the profile or in the casting. This means in turn that the casting may be the first or else the second element in the sense of this invention.

In a further exemplary embodiment, the first and the second elements are each a casting. In that case, for example, where one of the castings may have an aperture into which a part of the second casting can be inserted. Again, the depression may be provided in one casting or in the other. Accordingly, the casting having the aperture is by choice the first or second element in the sense of this invention.

In a further exemplary embodiment, the first and second elements are panellike elements. In that case the depression may be provided by choice in the first or in the second panellike element. Correspondingly, the first or the second panellike element is the first element or the second element in the sense of this invention.

In a further exemplary embodiment, the first and the second elements are each a panellike element and a casting. For example, two panellike elements which have a U-shaped cross section may be adhesively bonded or welded to form a cavity. The casting may be arranged, for example, in this cavity. Again, the depression may be arranged either in the panellike element or in the casting. Correspondingly, the casting is the first or the second element in the sense of this invention.

It will be appreciated that it is also possible for more than two elements to be bonded to one another.

An essential advantage of the system proposed here is that it can be used to connect elements to one another that are very different in shape, because depressions can be provided on any desired element. This permits diverse use of the herein-proposed system of connected elements for motor vehicles.

The object stated at the outset is further achieved by a method for connecting elements of a motor vehicle, the method comprising the steps of: providing a first element, the first element having a depression on one surface; providing a second element; arranging the first element and the second element in such a way that a surface of the second element and the depression of the first element form a cavity; and introducing an adhesive into the cavity, the adhesive being introduced into the cavity through a filling aperture.

The method proposed here offers in turn the same advantages which have already been stated with regard to the herein-proposed system of connected elements. In particular, as a result, the method for the adhesive bonding of elements can be made more cost-effective and easier to manage.

In one exemplary embodiment, the method comprises the following additional step: shaping the depression on the surface of the first element.

In this case the depression may be shaped during the production of the first element, or else the depression may be shaped on the first element which has already been produced. A suitable variant may be chosen according to the method of production of the first element.

In one exemplary refinement, the depression is formed during shaping by embossing, impressing, stamping, machining, casting, or molding.

Again, a suitable method for forming the depression can be chosen here according to the method of production of the first element.

In one exemplary embodiment, the method comprises the following additional step: forming a filling aperture in the first element or in the second element, the filling aperture forming an access to the cavity.

In one exemplary embodiment, the method comprises the following additional step: curing the adhesive.

In one exemplary refinement, the curing of the adhesive is performed by use of a temperature of at least 120° C., preferably of at least 140° C., more preferably of at least 160° C.

By way of example, the curing of the adhesive may take place in an oven of the kind typically employed after the cathodic electrocoating (CEC) of the body. Temperatures prevailing in such ovens are typically between 120° C. and 220° C. Such temperatures are especially suitable for the full curing of adhesives which can be used in connection with this invention. Since the body with the connected elements and the solidified adhesive undergoes in any case the operation of electrocoating and subsequent application of heat in order to fully cure the coating system, the utilization of this application of heat in the oven after the electrocoating, for the purpose of fully curing the adhesive, is particularly advantageous.

In one exemplary embodiment, the temperature of the adhesive on introduction to the cavity is from 10 to 100° C., preferably from 20 to 80° C., more preferably from 30 to 70° C.

In one exemplary embodiment, the adhesive is introduced into the cavity at a volume flow rate of 0.1 to 5 cm$^3$/s, preferably of 0.5 to 4 cm$^3$/s, more preferably of 1 to 3 cm$^3$/s.

In one exemplary embodiment, the adhesive is conveyed from an adhesive tank via pump on introduction into the cavity.

In one exemplary embodiment, the adhesive is conveyed through a filling aperture in the first or in the second element on introduction into the cavity.

The provision of a filling aperture in the first or in the second element has the advantage that it allows the adhesive to be introduced into the cavity in a simple way, using robots, for example.

There are various adhesives that can be used. By way of example, the adhesive may be selected from the following group: one-component epoxy adhesive, two-component or multicomponent epoxy adhesive, two-component acrylic acid, or two-component polyurethane adhesive.

In one specific exemplary embodiment, an adhesive is used which is available commercially under the name Sika-Power®. By way of example, the commercially available products SikaPower®-497 and SikaPower®-477R can be used.

In alternative specific working examples, an adhesive is used which is available commercially under the name Sika-Fast® or SikaForce®.

A suitable adhesive may be selected according to materials and surfaces of the first and second element that are used and/or according to application parameters of the adhesive.

Details and advantages of the invention are described below in reference to working examples and in relation to schematic drawings. In the drawings.

Figure 1:
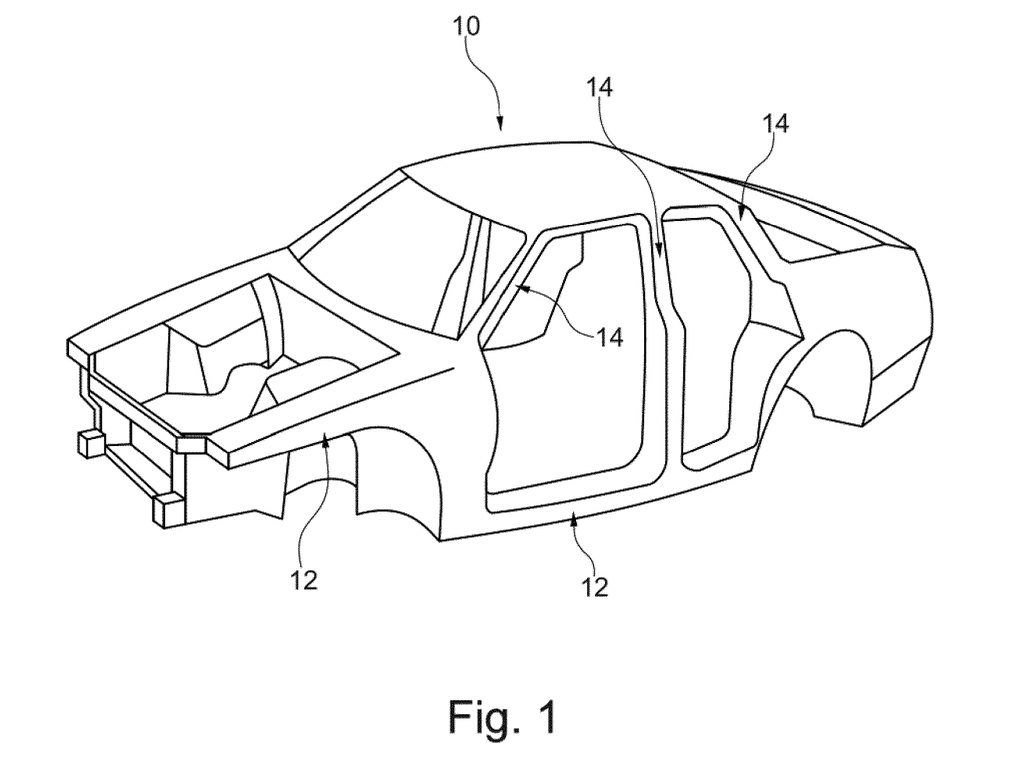
FIG. 1 shows an exemplary representation of a body of a motor vehicle.

Depicted schematically in FIG. 1 is a body 10 of a motor vehicle. The body 10 here comprises various structures, such as columns 14 and cross struts 12, for example. Body 10 structures of this and other kinds have to be connected to one another in a suitable way. In particular, profiles, castings, and panellike elements may be connected to one another.

Figure 2:
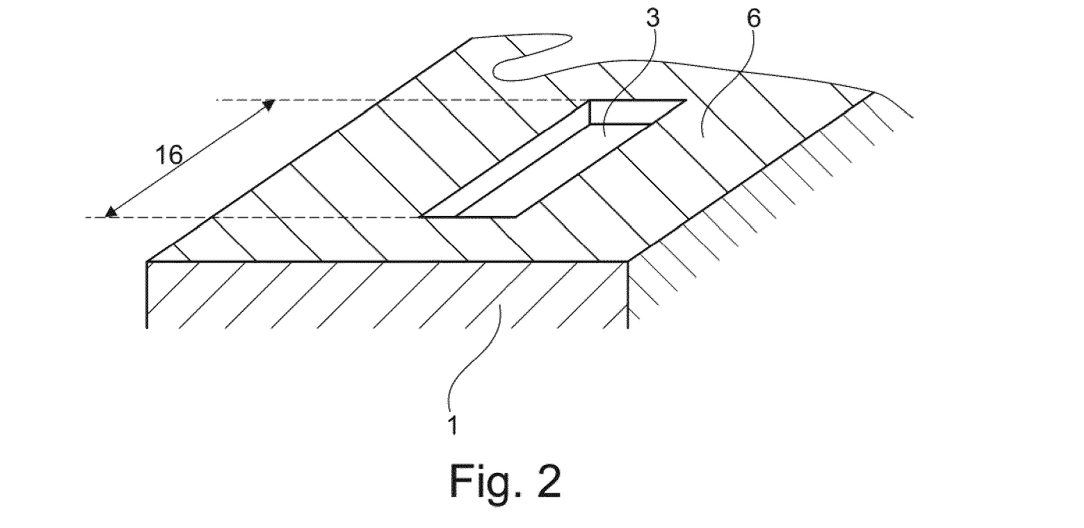
FIG. 2 shows a schematic representation of an exemplary first element.

Depicted schematically in FIG. 2 is a detail of a first element 1. The first element 1 here has a depression 3 on its surface. The surface of the first element 1 forms a shoulder 6 next to the depression 3. The depression 3 here has a depression length 16.

Figure 3:
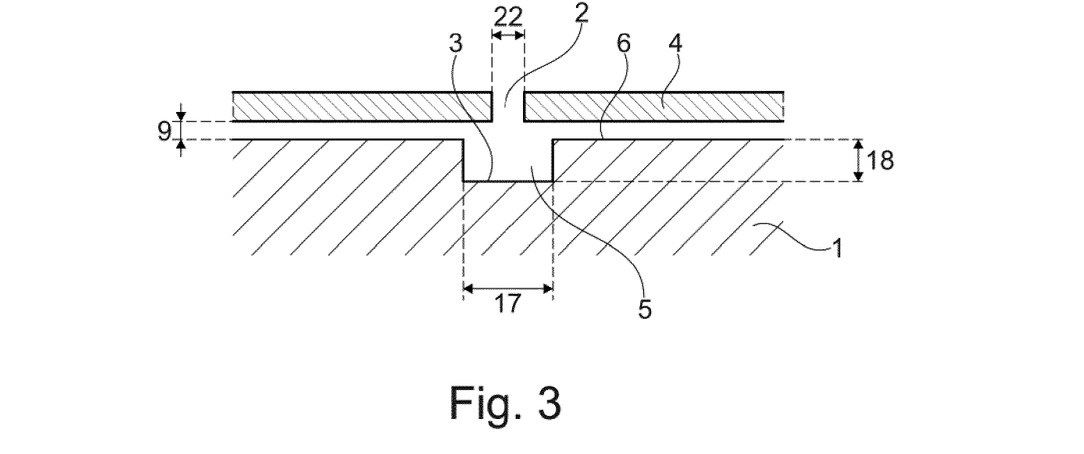
FIG. 3 shows a schematic representation of an exemplary first and second element.

Depicted schematically in FIG. 3 is a cross section of a detail of a first element 1 and of a second element 4. The first element 1 again has a depression 3, which is formed on the surface of the first element 1. The depression 3 here has a depression width 17 and a depression depth 18. The cross section of the depression 3 in this exemplary embodiment is rectangular in form. A shoulder 6 is again formed next to the depression 3.

The second element 4, then, is arranged relative to the first element 1 in such a way that a cavity 5 is formed between the depression 3 of the first element 1 and the second element 4.

In this case there is a distance 9 between shoulder 6 of the first element 1 and the surface of the second element 4. In FIG. 3, this distance 9 is exaggerated for more effective appreciation. According to one exemplary embodiment, this distance 9 is at most 1 mm.

The second element 4 in this exemplary embodiment has a filling aperture 2, which has a diameter 22. Through this filling aperture 2, the adhesive (not depicted in this figure) can be introduced into the cavity 5.

In an alternative embodiment not depicted, the filling aperture may also be arranged in the first element 1. Depending on accessibility, the arrangement of the filling aperture in the first or in the second element may be accompanied by advantages.

Figure 4A:
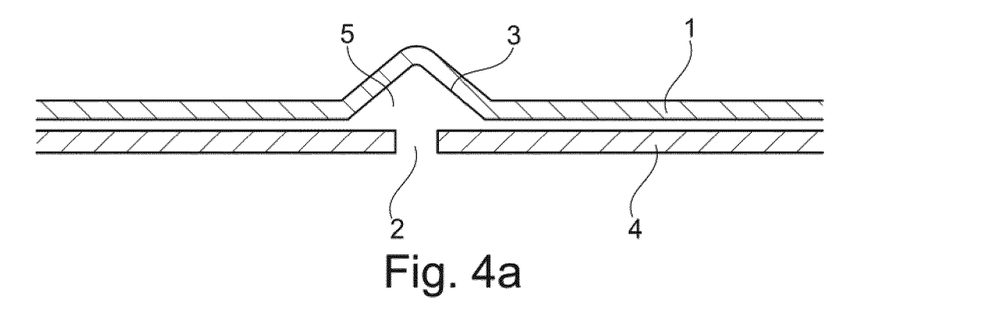
FIGS. 4a to 4c show a schematic representation of an exemplary first element and second element.
Figure 4B:
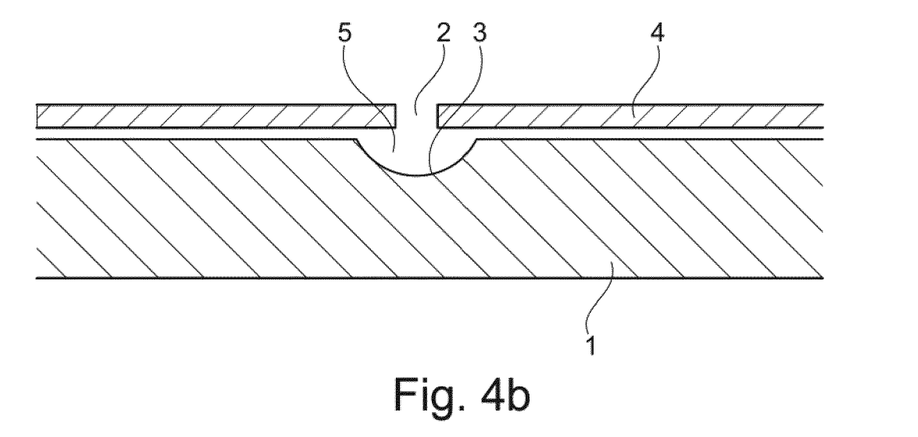
Figure 4C:
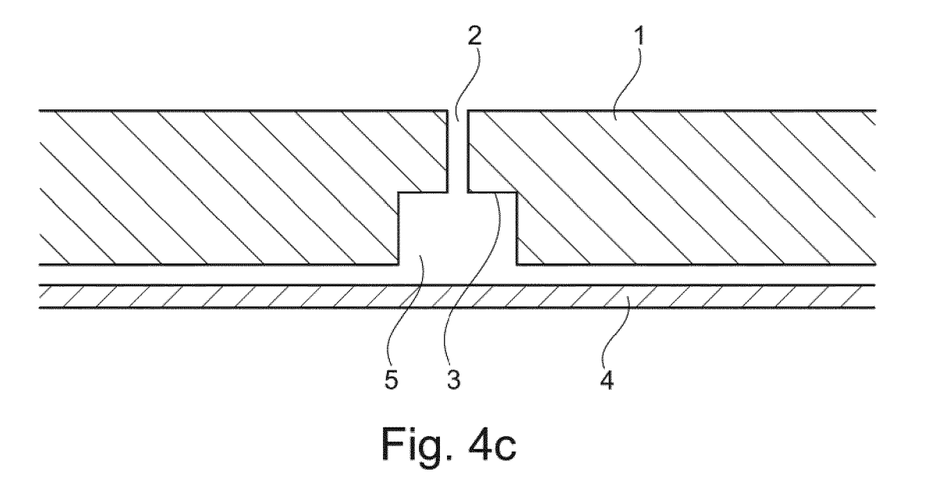

FIGS. 4a to 4c depict various embodiments of an exemplary first element 1 and of an exemplary second element 4. A depression 3 is arranged in each case on one surface of the first element 1. Formed between this depression 3 and the second element 4 in each case is a cavity 5.

The exemplary first element 1 in FIG. 4a has a depression 3 which has a V-shaped cross section. In this exemplary embodiment, the filling aperture 2 is arranged in the second element 4.

In the exemplary embodiment according to FIG. 4b, the first element 1 has a depression 3, which has a U-shaped or semicircular cross section. In this exemplary embodiment, the filling aperture 2 is again arranged in the second element 4.

The exemplary embodiment of the first element 1 that is depicted in FIG. 4c has a depression 3 which has a rectangular cross section. In this exemplary embodiment, the filling aperture 2 is arranged in the first element 1.

Figure 5A:
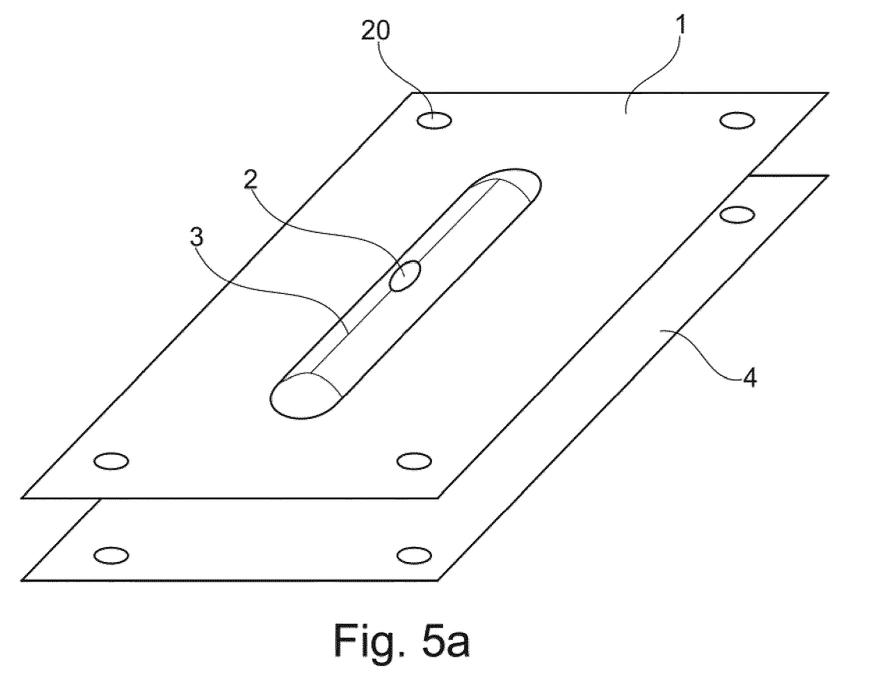
FIGS. 5a and 5b show a schematic representation of an exemplary first element and second element.
Figure 5B:
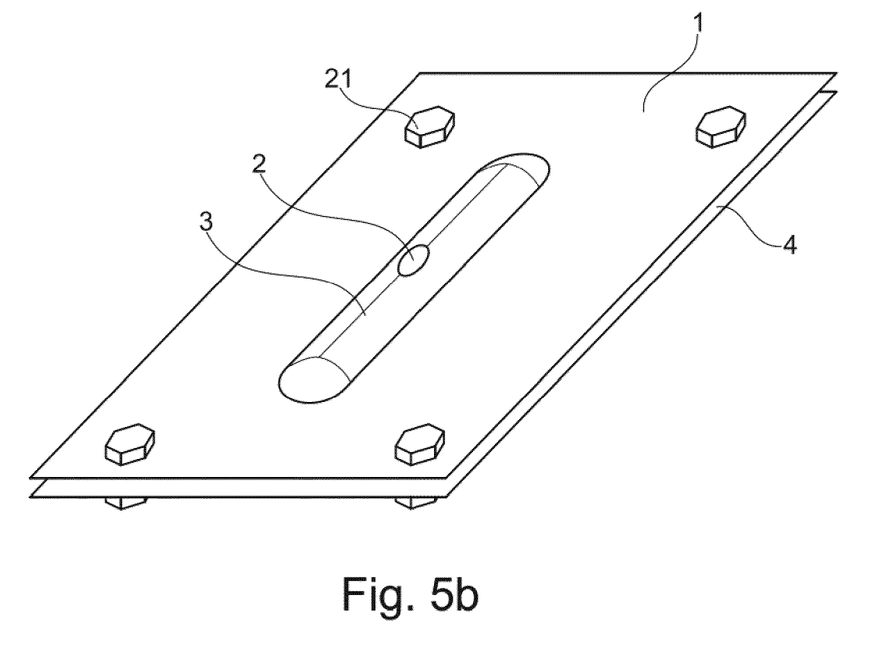

FIGS. 5a and 5b each depict a first element 1 and a second element 4, with FIG. 5a depicting the elements before their arrangement for bonding, and FIG. 5b showing the elements arranged relative to one another for bonding. In this exemplary embodiment, the elements 1, 4 are each in the form of metal panels. In this case the depression 3 in the first element 1 has been shaped into the panel by embossing or stamping.

In FIG. 5a, holes 20 are depicted in the elements 1, 4. FIG. 5b shows fastening means 21, which in this example are implemented as screws and which protrude through the holes 20. These fastening means 21 serve for fixing of the first element 1 and of the second element 4 relative to one another, before the adhesive is introduced through the filling aperture 2.

Figure 6A:
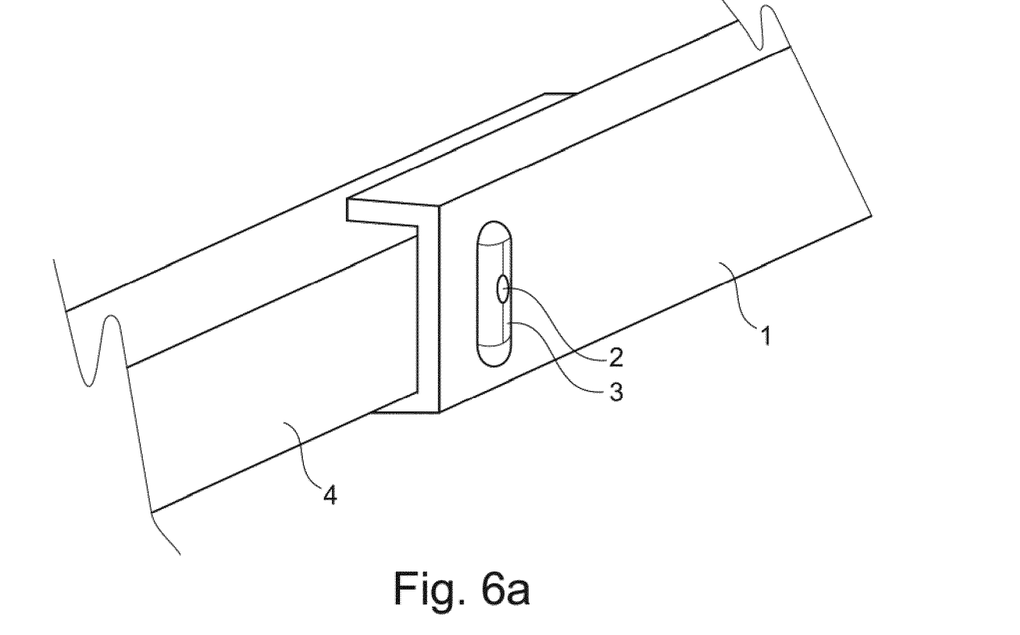
FIGS. 6a and 6b show a schematic representation of an exemplary first element and second element.

Depicted in FIG. 6a is an exemplary combination of a first element 1 with a second element 4. In this case the first element 1 takes the form of a curved panellike element, and the second element 4 takes the form of a profile. In this exemplary embodiment, the filling aperture 2 is arranged in the first element 1.

Figure 6B:
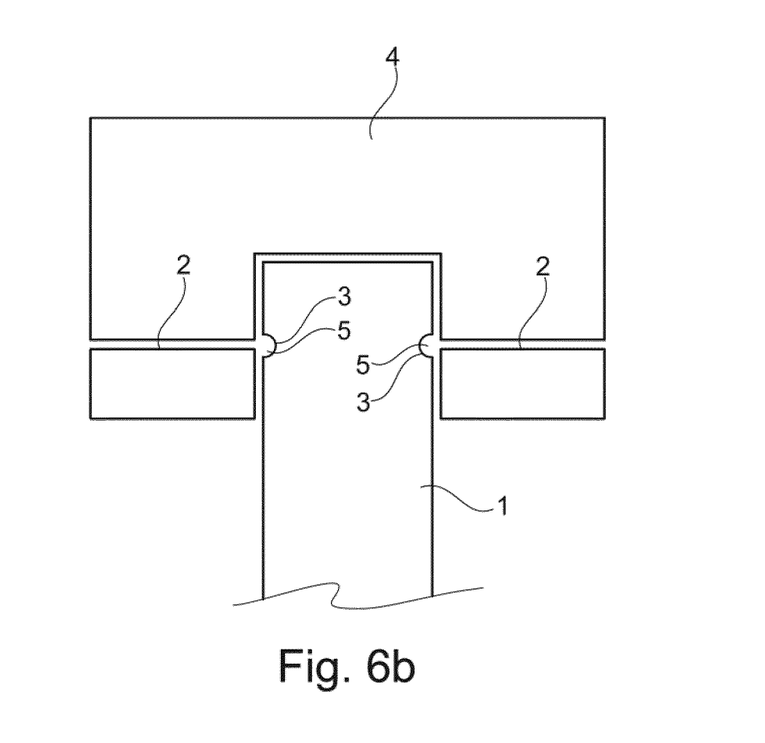

Depicted in FIG. 6b is a further exemplary combination of a first element 1 with a second element 4. In this case the first element 1 takes the form of a profile, and the second element 4 takes the form of a casting. In this exemplary embodiment, the filling aperture 2 is arranged in the second element 4.

Figure 7:
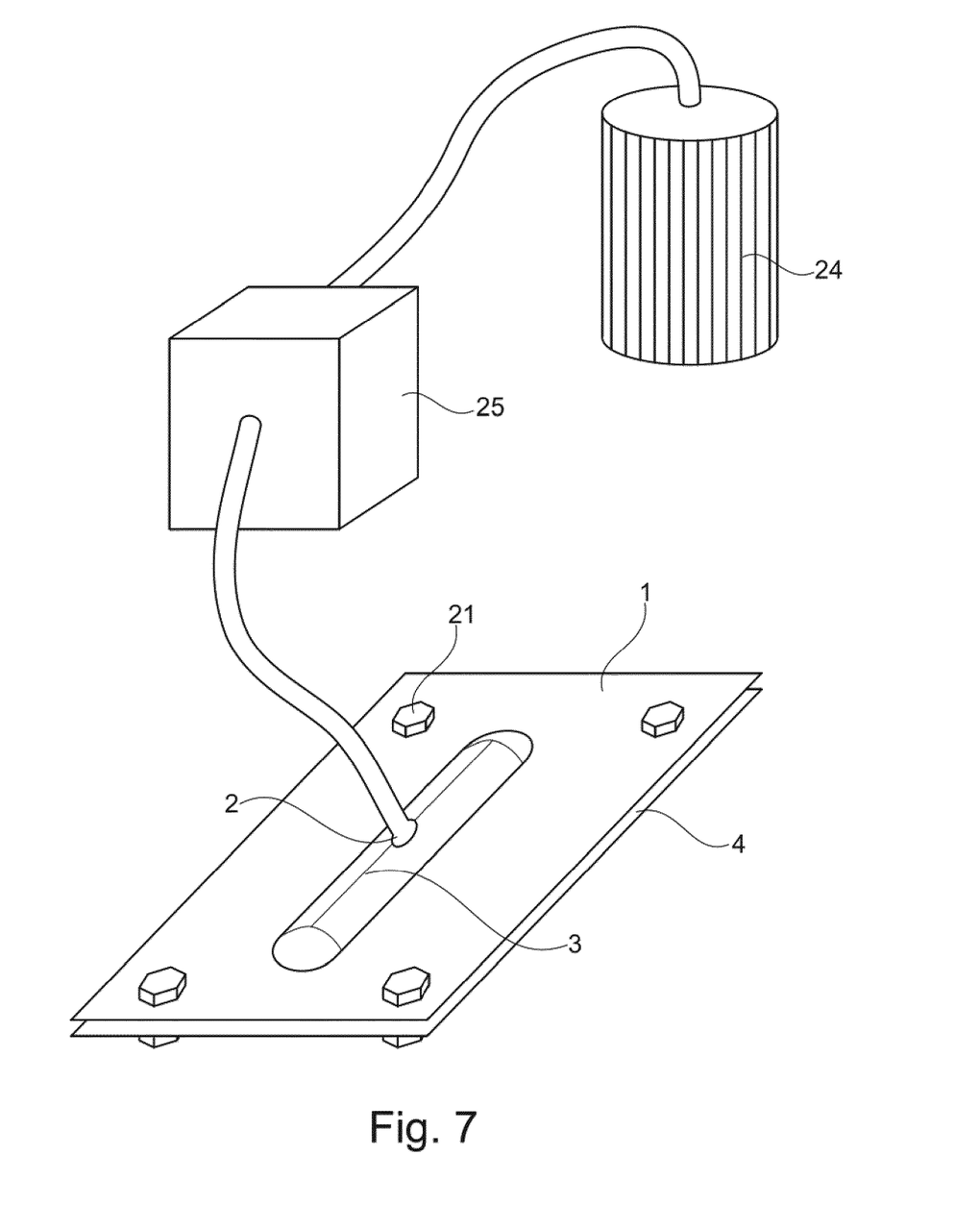
FIG. 7 shows a schematic representation of an introduction device.

Depicted in FIG. 7 is a device for introducing the adhesive into the cavity between the first and second elements (not apparent on this depiction). A pump 25 here conveys adhesive from an adhesive tank 24 through a filling aperture 2 in the first element 1 into the cavity between first element 1 and second element 4.

The first element 1 and the second element 4 are preliminarily fixed by fastening means 21, so that a relative arrangement of the elements to one another does not change when the adhesive is introduced.

KEY TO FIGURES 1 first element
2 filling aperture
3 depression
4 second element
5 cavity
6 shoulder
9 distance between shoulder and second element
10 body
12 cross strut
14 column
16 depression length
17 depression width
18 depression depth
20 hole
21 fastening means
22 diameter of filling aperture
24 adhesive tank
25 pump

The invention claimed is:

1. A method for connecting elements of a motor vehicle, the method comprising the steps of:
   providing a first element, the first element having a panel-like form and a depression on one surface that is formed by embossing or by impressing or by stamping;
   providing a second element;
   arranging the first element and the second element in such a way that a surface of the second element and the depression of the first element form a cavity;
   introducing an adhesive into the cavity, the adhesive being introduced into the cavity through a filling aperture,
   wherein the adhesive during introduction into the cavity has a temperature of 10 to 100° C., and/or wherein the adhesive is introduced into the cavity with a volume flow rate of 0.1 to 5 cm$^3$/s.

2. The method as claimed in claim 1, wherein the method comprises the following additional step: shaping the depression on the surface of the first element.

3. The method as claimed in claim 1, wherein the method comprises the following additional step:
   forming the filling aperture in the first element or in the second element, the filling aperture forming an access to the cavity.

4. The method as claimed in claim 1, wherein the method comprises the following additional step:
   curing the adhesive.

5. The method as claimed in claim 1, wherein the method is carried out with elements of the system of connected elements for the motor vehicle comprising:
   the first element which has at least one depression on one surface;
   the second element, which is arranged on the first element in such a way that the surface of the second element and the depression of the first element form the cavity;
   the filling aperture which forms an access to the cavity; and
   the adhesive which at least partially fills the cavity and thereby bonds the first element to the second element.

6. The method as claimed in claim 1, wherein the second element has a panel-like form.

* * * * *